March 18, 1930.  O. V. KRUSE  1,750,805
FLUID CONTROL SYSTEM
Filed Jan. 31, 1925  5 Sheets-Sheet 2

INVENTOR
Otto V. Kruse
BY
Edwards, Sager & Bower
his ATTORNEYS

March 18, 1930.　　　O. V. KRUSE　　　1,750,805
FLUID CONTROL SYSTEM
Filed Jan. 31, 1925　　　5 Sheets-Sheet 3

INVENTOR
Otto V. Kruse
BY
Edwards, Sager & Bayer
ATTORNEYS

Patented Mar. 18, 1930

1,750,805

UNITED STATES PATENT OFFICE

OTTO V. KRUSE, OF NARBERTH, PENNSYLVANIA, ASSIGNOR, BY MESNE ASSIGNMENTS, TO I. P. MORRIS CORPORATION, A CORPORATION OF DELAWARE

FLUID-CONTROL SYSTEM

Application filed January 31, 1925. Serial No. 6,126.

This invention relates to control means for valves for large mains and conduits, such as the well known Johnson valve.

The object of the invention is to provide a control system which will be simple, durable and accurate and which will enable the valve plunger to be precisely moved to and held in any desired position.

A further object of the invention is to provide a system which will automatically cause a closure of the valve upon the occurrence of abnormal conditions increasing the flow through the valve or causing an undue rise of pressure in the valve conduit or both.

Further objects of the invention particularly in the actuation of the automatic control means by a remotely controlled motor drive will appear from the following description taken in connection with the accompanying drawings in which—

In the specific embodiment of the invention shown in the drawings the main valve is the well-known Johnson valve and the system is illustrated in connection with the control of this valve but it is obvious that the system could be applied to other forms of valves.

Figure 1:
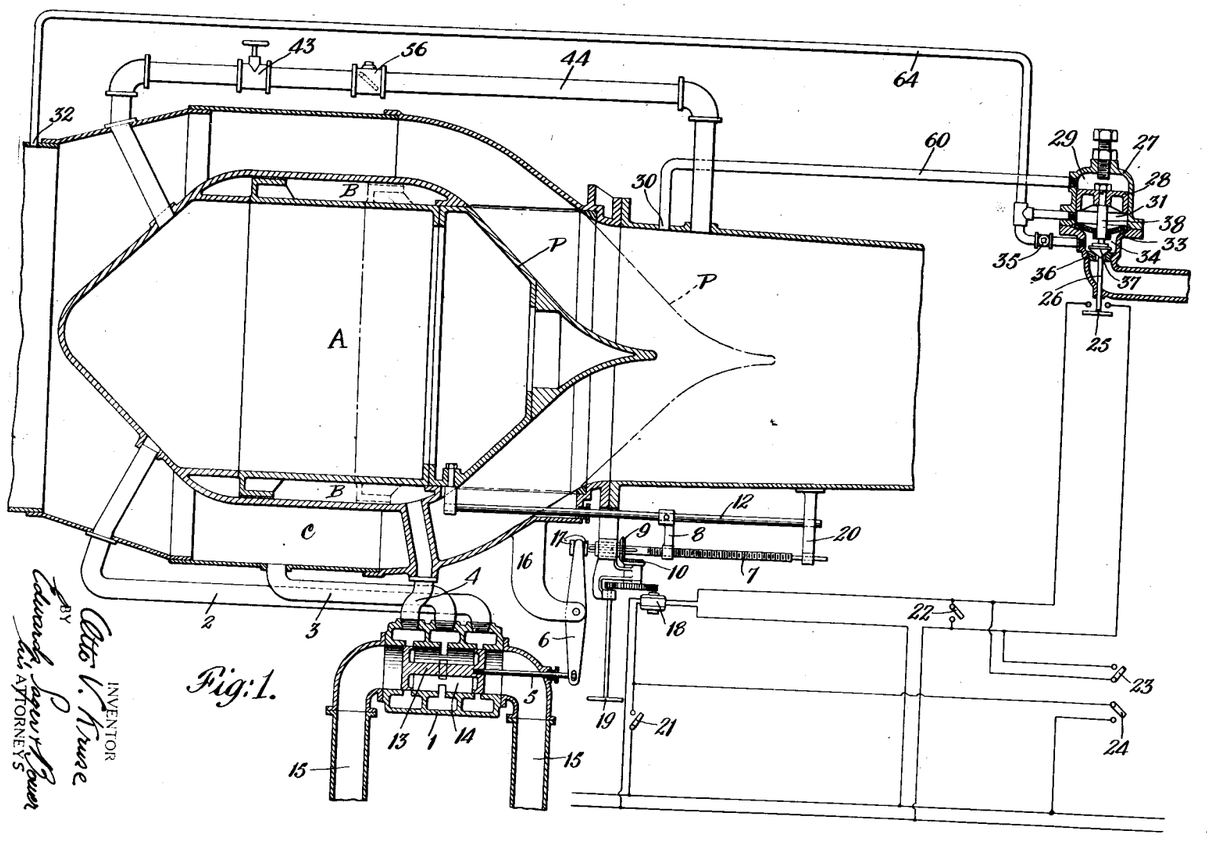
Fig. 1 is a diagrammatic view of the system applied to a Johnson valve.
Figure 2:
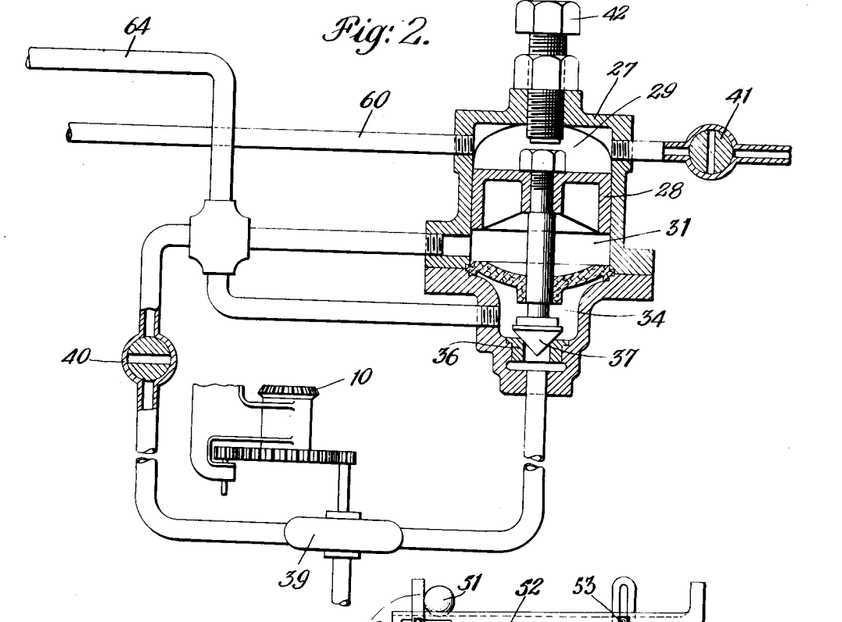
Figs. 2, 3 and 4 are views of modified details.

The cross-section of the main valve is indicated in the upper left hand corner. The plunger, or moving element P is shown in the open position, but its closed position is indicated by dot and dash lines. The plunger P is of the usual shape, forming with the internal cylinder two operating chambers A and B. The main valve indicator 12 is attached to the plunger and extends outside of the valve body to show the position of the valve plunger P at all times.

The valve plunger is opened and closed the same as the ordinary type of Johnson valve, namely by exhausting pressure from chamber A and admitting pressure to chamber B the valve is opened, and exhausting pressure from chamber B and admitting it to chamber A results in closing the valve. This interchange of pressure is accomplished by means of a ported piston valve 1 shown in section in the lower left hand corner of Fig. 1 and with pipe connections indicated to the operating chambers of the main valve. Connection 2 joins the control valve with the central chamber of the main valve; connection 3 joins the control valve with the conduit C of the main penstock or valve body, thereby providing a source of pressure supply for the two operating chambers. Connection 4 joins the control valve with the annular chamber of the main valve. A piston 13 slides laterally in the control valve 1 and is shown in the central position cutting off all communication with the connections 2, 3 and 4. This piston is arranged to provide an annular space 14 which is in communication at all times with a pressure supply obtained from connection 3. A drain 15 is provided at either end of the control valve piston.

If piston 13 is moved towards the left pressure is admitted from chamber 14 to connection 4 and is exhausted from connection 2 to drain 15. This results in supplying pressure to annular chamber B and exhausting pressure from central chamber A. This results in opening the main valve. A motion of piston 13 to the right connects chamber 14 with pipe 2 and pipe 4 with drain 15, thus producing the opposite interchange of pressure in chambers A and B and resulting in closing the main valve.

A rod 5 is fastened to piston 13 and passes through the drain pipe 15 terminating at the end of a lever 6. Lever 6 is pinned to a bracket 16, this connection serving as a fulcrum about which lever 6 moves. The opposite end of lever 6 is held between two collars 17 which are a part of operating shaft 7. A gear 9 is keyed to shaft 7 so that shaft 7 rotates with gear 9. This keyed connection, however, allows lateral motion of shaft 7, while gear 9 remains axially stationary. A gear 10 meshes with gear 9 and serves to rotate gear 9. The rotation of gears 9 and 10 is accomplished by an electric motor 18 or a hand wheel 19, both of these being attached to gear 10 through suitable reduction gearing as shown.

A block 8 is attached rigidly to indicator rod 12 and is threaded at its opposite end to form a screwed connection with shaft 7. A suitable bearing bracket 20 is arranged to support the outer ends of indicator rod 12 and shaft 7.

Assuming that the main valve is wide open, gear 10 is rotated either by motor or hand wheel, thus rotating gear 9 and moving shaft 7 to the left. This lateral motion of shaft 7 is accomplished by virtue of the threaded connection between shaft 7 and block 8 and the spline keyed connection between shaft 7 and gear 9. A left hand motion of shaft 7 moves lever 6 and produces a right hand motion of shaft 5 and piston 13. It will be seen that this operation as above described will begin the closing stroke of the main valve. As soon as the main valve starts to close indicator rod 12 moves towards the right and brings with it shaft 7 on account of the threaded connection between shaft 7 and block 8, the latter being rigidly attached to indicator rod 12. This serves to produce a left hand motion of rod 5 and piston 13 and cuts off the ports in the control valve, thus preventing further interchange of pressure and stopping the motion of the main valve plunger. It will, therefore, be seen that a continuous rotation of gears 9 and 10 must be carried on to allow continuous closing of the main valve plunger. When the main valve is entirely closed block 8 is near bearing 20, since the indicator rod has moved to its extreme right hand position.

To open the main valve the opposite rotation of gears 10 and 9 is performed by means of motor or hand wheel, this resulting in a right hand motion of shaft 7, and a left hand motion of rod 5 and piston 13. This exhausts pressure from connection 2 and admits pressure to connection 4, thus resulting in opening the main valve. The restoring feature is operative in the same manner as for closing, the block 8 moving with the indicator and tending to move shaft 7 to cut off the ports in the control valve.

In this control the motion of the control mechanism is coordinated with the movement of the valve plunger so that there is no tendency for one element to move without the other. In other words, the main valve can be set at its extreme positions or at any intermediate positions without tendency to move, except in response to movement of the control.

A switch 21 is provided to operate motor 18 for opening the main valve; likewise a switch 22 is provided for closing the main valve by means of the motor, the switches 21 and 22 being positioned at any convenient location near the hand operating means 19. Either of these switches 21 or 22 when closed completes the electrical circuit to the motor but in opposite directions. Likewise switches 23 and 24 indicate additional remote control means for operating the valve from a distance. Still further, switches could be provided for additional control stations if desired.

In order to provide for automatic closure in case of an accident, a means is shown for closing the circuit to the motor in the same manner as it would be closed by hand. A bar 25 is indicated for completing the motor circuit, this bar being moved vertically upward to close the circuit by means of rod 26. A cylinder 27 contains a piston 28, which slides therein. There is a pipe connection 60 to chamber 29 above the piston, this pipe leading to connection 30 just beyond the discharge end of the main valve. Similarly, chamber 31 below the piston is joined by a pipe 64 to a connection 32 at the entrance end of the main valve. A diaphragm 33 separates chamber 31 from a chamber 34, which is also connected to a pipe leading to connection 32. Connection 32 therefore provides a pressure supply from the entrance end of the valve to chambers 31 and 34. A cock 35 is used for throttling the connection to chamber 34, so that a drop in pressure in this chamber will not affect the pressure in chamber 31. A bushing 36 separates chamber 34 from the drain, there being a hole in this bushing which is closed off by a needle valve 37. It will therefore be seen that with the main valve open and without flow in the penstock the pressure communicated from connections 30 and 32 will be the same magnitude, and this will result in equal unit pressures in chambers 29, 31 and 34. Under these conditions needle valve 37 is held against bushing 36, thus closing off the hole in this bushing. In order to open needle valve 37 sufficient upward pressure must be exerted on piston 28 to overcome the downward force which is equal to the unit pressure times the area of the hole in bushing 36. It will be noted that rod 26 is attached to needle valve 37, this in turn being connected to piston 28 by means of shaft 38. Hence an upward movement of piston 28 results in closing the motor circuit by means of bar 25, this in turn closing the main valve.

The upward movement of piston 28 or bar 25 may be caused in any desired manner and in particular may be caused by a change in velocity in the conduit such as would be due to a break excessively increasing the velocity.

Under normal conditions of flow in the penstock the unit pressure at 32 is the full static pressure less the velocity head at this point. Likewise the unit pressure at 30 is the full static pressure less the velocity head. In the valve installation shown the velocity at the entrance end of the valve is less than at the outlet end, since the area is greater at the entrance end. It is therefore seen that the pressure conveyed to chamber 31 is greater than the pressure conveyed to chamber 29 by an amount equal to the difference in velocity head between the entrance and outlet ends of the valve. Under the maximum normal velocity in the pipe there is an upward force on piston 28 on account of the lower unit pressure in chamber 29. This upward force however is overcome by the exposed area of needle valve 37 where it closes off the hole in bushing 36. It is therefore seen that the hole in bushing 36 is made large enough to overcome the difference in pressure in chambers 31 and 29, and thus keep needle valve 37 seated under these conditions of flow. If a break should occur beyond the outlet end of the valve, or any other emergency arise, producing a velocity in excess of normal a new condition of pressures is established in chambers 29 and 31. The pressure in chamber 31 has dropped to some extent on account of the increased velocity at the entrance end of the valve, but the pressure in chamber 29 has decreased a greater amount on account of the increased velocity at the outlet end of the valve. In other words, for each unit drop of pressure occurring at 32 there is a greater proportionate drop occurring at 30 on account of the fact that the velocity head varies with the square of the velocity rather than directly. This greater difference between pressures in chambers 31 and 29 will result in lifting needle valve 37 and closing the motor circuit. The cock 35 is throttled in such a way that exhaust of pressure from chamber 34 through the hole in the bushing will not affect the pressure in chamber 31.

With the motor circuit closed by bar 25 the main valve moves towards its closed position and is finally seated. It will be noted that the pressure in chamber 29 decreases and eventually becomes zero when the valve is seated, while the pressure in chamber 31 is maintained at full static head. This is a favorable characteristic, as once the necessary pressure difference is established the closing of the valve will continue without danger of the switch being reopened.

As an alternative to the electric motor operation I have indicated an impulse wheel 39 which operates gear 10 in the same manner as the electric motor. An operating cock 40 supplies pressure to the impulse water turbine and rotates it in the proper direction for opening the main valve. In other words, cock 40 when open provides a supply of water under penstock pressure from the connection 32 on the main valve. The element for producing automatic closing when the velocity in the penstock exceeds normal is the same as for electric motor operation, except that the lifting of needle valve 37 provides a pressure supply from connection 32 directly to the impulse turbine. In other words, the water for operating the impulse turbine to close the main valve is supplied through the hole in bushing 36. A cock 41 is used to exhaust the pressure from the chamber 29, thus lifting piston 38 in the same manner as it is lifted automatically by an excess velocity. Therefore, the opening of cock 41 will supply pressure from connection 32 to the impulse turbine and will result in closing the main valve. A jack screw 42 is arranged to limit the upward travel of piston 29 and hence control the supply of pressure to turbine 39. Likewise an adjustment of cock 40 will regulate the pressure to this same turbine for opening the main valve. It will, therefore, be seen that the rate of operation of the main valve in either direction is adjustable at will by controlling the supply of pressure, and hence the speed of the impulse turbine.

The chief advantage of the impulse turbine is that it will operate submerged, should the emergency be great enough to put the entire valve and control under water. The advantage of locating cock 41 in the position shown for ordinary closing is that the automatic element is used regularly and hence there is no danger of its sticking. Likewise, a similar cock could be used for lifting bar 25 to complete the electric circuit when the motor is used in place of the impulse turbine.

A further addition to this method of control consists of a pipe connection 44 between the operating chamber A of the main valve and the pipe beyond the valve. This connection is provided with a throttling valve 43 and a check valve 56. The purpose of this arrangement is to offset to some extent the quick drop in pressure which takes place beyond the valve as the valve plunger is nearing its seat. This connection would be most useful when the flow in the penstock is very small, such as would exist due to the leakage through the turbine gates. For example, assume that piston 13 is moved towards the right uncovering the port which exhausts pressure from the annular chamber, and also uncovering the port admitting pressure to the central chamber. Under these conditions the valve plunger is moving towards the seat and some uncovering of these ports would be necessary to continue this motion, particularly with full static pressure in the pipe beyond the valve. As the valve nears the seat the pressure beyond may drop rather quickly, this tending to force the plunger closed, which in turn would move piston 13 to the left and cut off the ports. The plunger would still continue to close due to leakage and would not be stopped until piston 13 had moved still further to the left, uncovering the ports as is done for the opening stroke, and in this manner stop the further progress of the plunger. In other words, when piston 13 is moved far enough to the left, the ports are sufficiently uncovered to offset the leakage and the plunger is held stationary.

It will be noted that during this cycle the control remains stationary while the plunger travels a distance sufficient to move piston 13, blanking off the ports and eventually opening them in the opposite direction. There is therefore a small motion of the plunger which would occur with the control stationary during this period when the pressure is dropping beyond the valve. Pipe 44 would serve to communicate this drop in pressure beyond the valve to the chamber A at the instant the drop occurred. Under these circumstances there would be no violent difference in pressure on the two sides of the plunger which would tend to move it beyond the setting of the control. A throttle valve 43 would make possible any desired amount of this pressure communication between the central chamber and the pipe beyond the valve. In other words, this might be so set that the plunger would move sufficient to cut off the ports in the control valve, at which time the plunger would stop moving unless the control was opened towards the closed position. With this setting the opening through valve 43 would just be sufficient to overcome the leakage around the fit of the plunger. A smaller opening of valve 43 would allow the plunger to move farther before it was held by the control, while a larger opening would not permit it to move as far. The check valve 56 permits flow out of the chamber A to accomplish the desired effect as set forth above, but does not allow back flow into the chamber A. This also automatically avoids interference with the opening of the main valve at which time the chamber A is being exhausted.

Figures 3, 4:
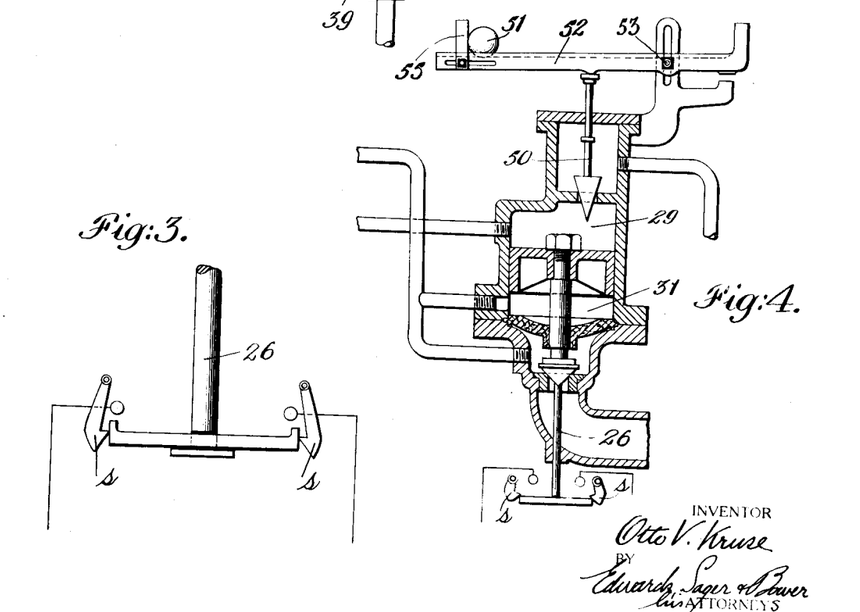

As alternative to the means described above for holding the switch 25 closed during the closing movement of the main valve, or in addition to said means the switch 25 itself may be movable with relation to its stem 26 as shown in Fig. 3 and may be automatically latched in its closed position, for instance by the pivoted latch members s on each side. When the stem 26 lifts the switch 25 into contact with the terminal the latches s will catch under the switch 25 and hold it in closed position irrespective of any subsequent movement of the stem 26.

Figure 5:
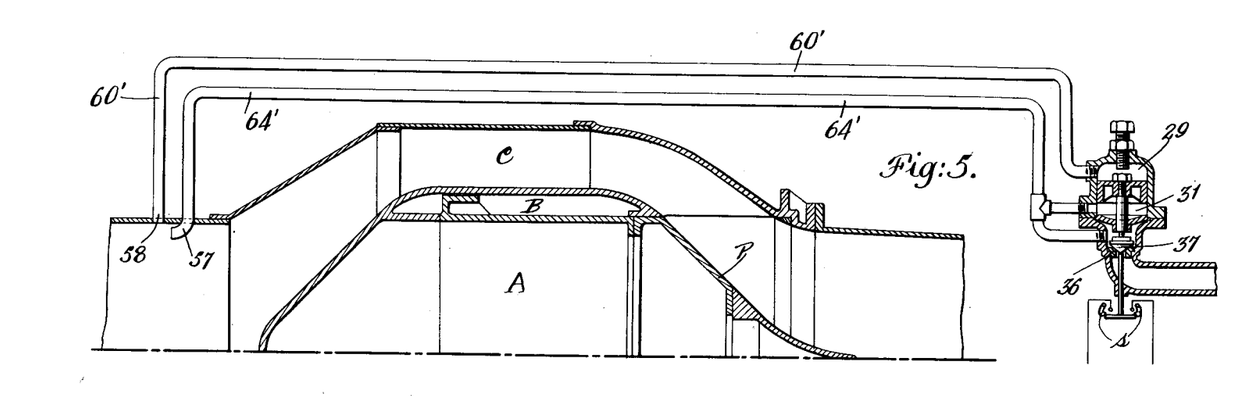
Fig. 5 is a diagrammatic view of a modified detail.

Instead of relying on differences in cross sectional area at points 30 and 32 to develop different velocity effects other arrangements may be adopted depending for instance on Pitot tube and piezometer action without any difference in cross-sectional area. In Fig. 5, for instance, the high pressure connection 64' corresponding to pipe 64 of Fig. 1, receives its pressure from a Pitot tube connection 57 having its inner bent end facing the flow so as to accumulate velocity head in addition to the static pressure head. The low pressure connection 60' corresponding to pipe 60 of Fig. 1, receives its pressure from the piezometer connection 58 transmitting to chamber 29 the full pressure less the velocity head. At the same time the Pitot tube 57 transmits to chamber 31 the full pressure including the velocity head. It is therefore seen that with any given velocity in the pipe line the pressure in chamber 31 will be greater than the pressure in chamber 29 by the amount of the velocity head, corresponding in effect to the connections to points of different velocity.

If the velocity increases beyond a certain predetermined amount, the pressure transmitted from piezometer 58 will be lowered while the pressure transmitted from Pitot tube 57 will remain substantially the same. Therefore when the velocity exceeds a certain amount, thus lowering the pressure in chamber 29 below a certain point, the automatic device will function to close the valve as described.

Where, as shown in Fig. 5, the Pitot tube and piezometer are on the same side of the valve plunger, either below or above the seat, the closing of the plunger will eventually eliminate the pressure difference so that a means such as latches s should be used to continue the closing stroke after it has once been started by the excess velocity.

The Pitot tube and piezometer connections may be placed either above or below the valve or on opposite sides of the valve, or in any desired location in the conduit—wherever the increase in velocity will work the desired control. For instance the piezometer 58 may be located as at 30 in Fig. 1 while the Pitot tube 57 remains above the valve. With the piezometer below the valve and the Pitot tube above the valve the closing of the valve will usually maintain the high pressure in connection 64' and relatively low pressure in the low pressure connection 60'.

It may also be desirable in some cases to provide for the automatic closing of the main valve in case there is any excessive rise in pressure in the conduit. To effect this the chamber 29 as shown in Fig. 4 may be provided with a safety relief means as shown comprising a needle valve 50 closing a discharge opening from the chamber 29 and held closed by a weight 51 at the end of a lever 52 adjustably pivoted at 53. A pressure rise in the main conduit when communicated to the chamber 29, will give sufficiently excessive rise to the valve 50 and lever 52 and cause the spherical weight 51 to roll towards the right in its cage on the lever 52, thus permitting the needle valve to be lifted its entire stroke under comparatively light and temporary pressure. The valve thus raised will remain raised irrespective of subsequent pressure changes so that the electric motor 18 or the impulse turbine 39 will continue to close the main valve. The duration of the pressure rise necessary to lift the relief valve 50 will be predetermined by the adjustment of the end of the lever at 53, while the magnitude of the pressure rise required will be adjusted by the position of the stop 55 determining the location of the ball 51.

Figure 6:
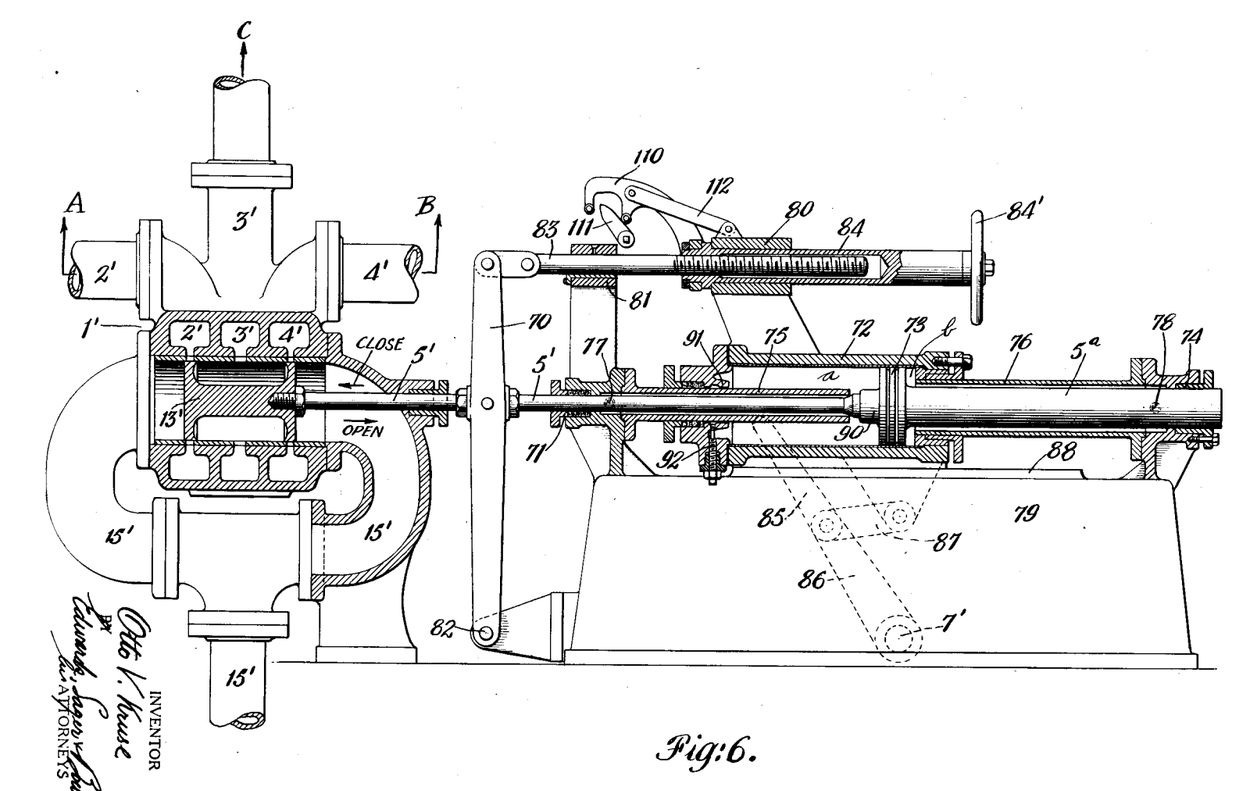
Fig. 6 is a diagrammatic view similar to a portion of Fig. 1 and illustrating a modified form of mechanism.

In Fig. 6 is shown a modification wherein the valve 1' has a piston valve 13' moving to the left to close the main valve plunger P and to the right to open said plunger the connections 2', 3' and 4' to the chambers A, C and B, being as shown in Fig. 1 but with the connections reversed, of course, in order at the valve 1'.

It will be seen that piston 13' has a relatively short motion in either direction, as the ports in the piston valve are purposely made narrow so that a small motion of the main valve plunger will restore the position of piston 13' and hence stop the motion of the main valve plunger P.

Figure 7:
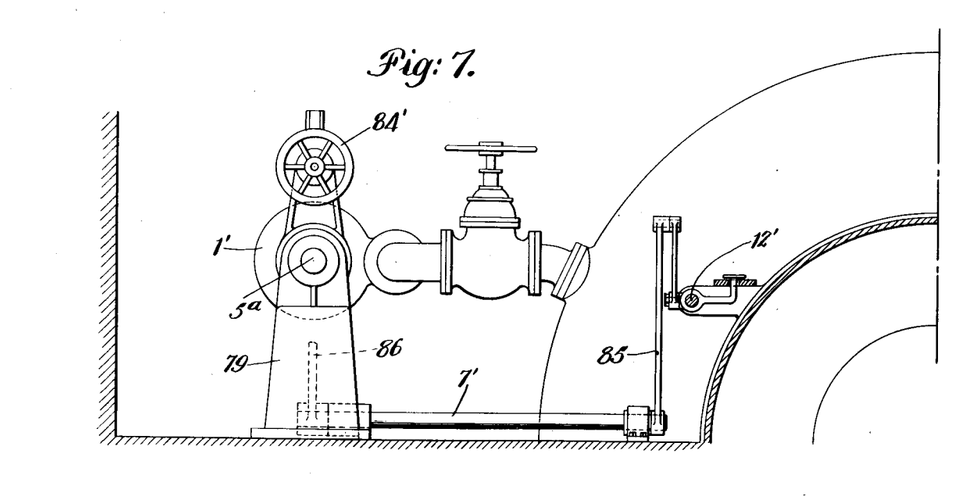
Fig. 7 is a partial elevational view of the mechanism shown in Fig. 6 connected to a valve.

The operating shaft 5' of the piston valve is connected to a lever 70 and then passes through a stuffing box 71 into a cylinder 72. Here it joins a piston 73 and then continues as rod 5ª larger in size through a stuffing box 74 to the exterior of the control mechanism. It is therefore seen that rod 5' piston 73 and rod 5ª are all rigidly connected and move together. The cylinder 72 slides on two sleeves 75 and 76. The sleeves are designed in such a way that an annular space is left around the rods 5' and 5ª for the transmission of water between the rods and the sleeves. There is a pipe connection 77 to the interior of sleeve 75 and a pipe connection 78 to the interior of sleeve 76. These two pipe connections provide pressure from the penstock to both sides of piston 73. Inasmuch as rod 5ª is larger than rod 5', there is a tendency for piston 73 to move toward the right or for cylinder 72 to move toward the left. A bed plate 79 is provided for supporting cylinder 72 and the bearings for rods 5' and 5ª. A bearing 80 is mounted on top of cylinder 72 and moves with cylinder 72. A bearing 81 is mounted on the bed plate and is therefore stationary. Lever 70 is attached to the bed plate at 82 and simply oscillates about this point. The other end of lever 70 is attached to a rod 83 which is moved by means of nut 84. Assuming that bearing 80 is stationary for the moment, the rod 83 can be moved to the left by turning the hand wheel 84' on nut 84. When this is done the piston 13' also moves to the left, connecting the annular chamber B of the main valve to the drain 15' and the central chamber A to pressure supply 3'. In moving rod 83 to the left, it will be noted that piston 73 also moves to the left at the same time and therefore it is necessary to apply sufficient force to rod 83 to overcome the unbalance due to the difference in size between rods 5' and 5ª. A rocker shaft 7' is connected to the indicator 12' of the main valve by means of lever 85, (Fig. 7). This rocker shaft is also connected to a lever 86 which in turn is attached to cylinder 72 by means of link 87. Rocker shaft 7' turns clockwise, (Fig. 6), when the main valve is closing.

When rod 83 is moved to the left, as described above, the piston 13' moves to the left. This results in the main valve plunger P beginning its closing stroke but as it closes, shaft 7' rotates clockwise and in this way cylinder 72 is moved toward the right. The unbalance due to rods 5' and 5ª causes piston 73 also to move to the right with cylinder 72 and in this way piston 13' again blanks the ports and prevents further motion of the main valve plunger P. If by any chance the main valve plunger should slightly overreach, piston 13' would uncover the ports in the opposite direction, connecting the central chamber to the drain and the annular chamber to pressure. This, of course, would tend to make the valve plunger move toward the open position. It is therefore seen that the hand wheel 84' on nut 84 must be turned in order to keep the main valve plunger in motion. As soon as the hand wheel is stopped, the main valve plunger also stops. When the valve is entirely closed, piston 13', rod 5', piston 73 and rod 5ª are all in the same position with respect to the bed plate, as indicated on the drawing. The cylinder 72, however, together with the nut 84 have moved toward the right along the sleeves 75 and 76 and along the finished surface of the bed plate 88.

To open the valve, the reverse operation is performed, in that the nut 84 is rotated in such a way that piston 13' will move toward the right and the cylinder 72 which is attached to the indicator of the main valve will gradually work its way toward the left, thus providing the restoring mechanism control in both directions. It will be seen that the function of the hydraulic connections to sleeves 75 and 76 is to provide an unbalance existing at all times, holding nut 84 in contact with bearing 80 whenever the control is operated by hand.

Figure 8:
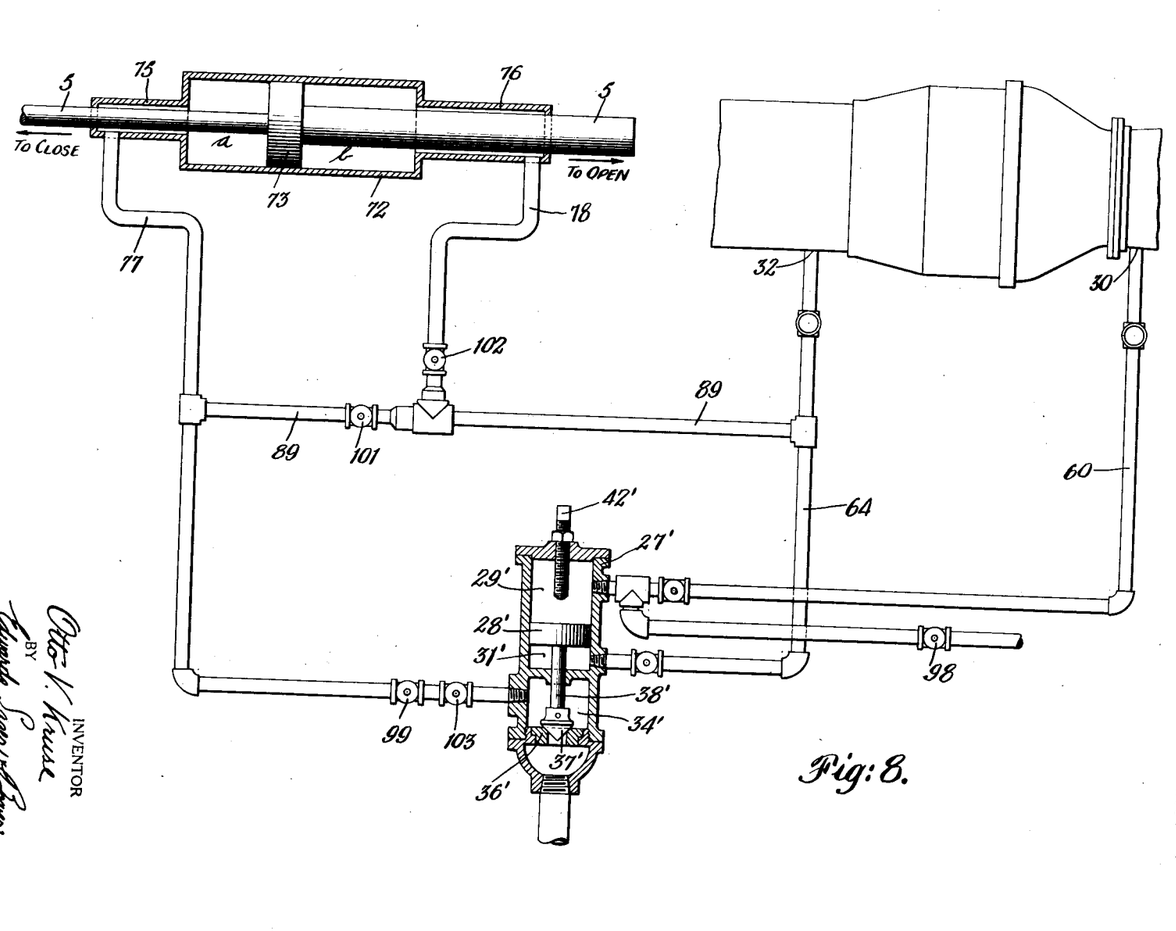
Fig. 8 is a diagrammatic view of the connections automatically controlling the mechanism of Fig. 6.

Cylinder 72 is the element of the control which is used for hydraulic closing or for automatic closing in the automatic system diagramed in Fig. 8. In this system the relief of pressure from chamber $a$ to the left of the piston 73 permits the piston and rod 5' to move to the left to close the plunger P.

The space $a$ is connected by pipe 77 to a chamber 34' opening through needle valve 37' to the drain. Lifting of valve 37' thus exhausts pressure from the control chamber $a$ and closes the main valve plunger P.

A pipe 89 provides a pressure supply for chamber *a* of cylinder 72, and also to chamber *b* on the opposite side of piston 73, this pipe 89 being provided with throttle cocks 101 and 102 so that the amount of pressure supplied to chambers *a* and *b* can be regulated. When needle valve 37' is raised pressure is exhausted from chamber *a* in spite of the admission of pressure through pipe 89, and the piston 13 tends to move toward the left by virtue of the full pressure being supplied at 78 through throttle cock 102.

As long as the pressure is being exhausted from chamber *a* the main valve plunger P will continue to close and carry cylinder 72 toward the right. The rate of closing depends on the rate at which the water is allowed to escape from chamber *a*. This can be regulated by throttle cock 103 or by jack screw 42' which limits the stroke of needle valve 37'. When the main valve plunger P approaches its closed position it is desirable to slow down the motion and this is accomplished by automatically restricting the rate at which water is discharged from chamber *a*. There is a projection 90 on piston 73 which enters opening 91 with simply a free sliding fit. As soon as these points come into contact the water from chamber *a* can no longer pass through the annular space between sleeve 75 and rod 5'; hence, if no other means were provided the valve would close to this point and no further. A needle valve 92 is shown which allows a by-pass around opening 91 so that the water from chamber *a* can pass through this needle valve and thence into the space between sleeve 75 and rod 5'. Therefore, by setting this needle valve, the last small portion of the stroke of the main valve can be slowed down to any desired rate.

Referring to Fig. 8, the needle valve 37' on rod 38' is operated by a piston 28' sliding in a cylinder 27'. The chamber 29' above piston 28' is supplied with pressure from the throat of the main Johnson valve through pipe 60. The chamber 31' below piston 28' is supplied with pressure from the penstock through pipe 64. If the velocity in the penstock should be about half the velocity that exists at the throat of the valve, then with piezometer connections at 30 and 32 the static pressures transmitted through pipes 60 and 64 would be different by the amount of difference in velocity head existing at 30 and 32. Therefore, when velocity exists through the penstock and through the valve, the unit pressure in the chamber 29' above piston 28' is always less than the unit pressure in the chamber 31' below piston 28'. This difference in unit pressure would normally cause piston 28' to be raised but needle valve 37' is exposed to the atmosphere when closed, by virtue of the opening in bushing 36'. The opening in bushing 36' can be made of sufficient size to just overcome the difference in unit pressures existing on the two sides of piston 28'. For example, assuming that a velocity of 20 feet per second exists at 30 and a velocity of 10 feet per second exists at 32, the unit pressure above piston 28' would be somewhat lower than the pressure below piston 28' but there would not be enough difference to overcome the opening in bushing 36'. If these velocities were increased to 15 feet per second and 30 feet per second the unbalance on piston 28' would be greater than the force due to the opening in bushing 36' and the needle valve 28' would be opened. The opening of needle valve 37' results in a discharge of pressure from chamber *a* and the closing of the main Johnson valve, as described above. In this method of closing the valve the automatic closing responds only to an increase in velocity and is not affected by ordinary changes of pressure or surging which occasionally takes place in a penstock. In other words, the valve is closed by a high velocity in the penstock which can only result from a break or some other emergency which necessitates the automatic closing.

The remote closing of the valve or hydraulic closing at the valve can be accomplished by opening cock 98 and exhausting the pressure from chamber 29' above piston 28' directly to the atmosphere. This immediately allows the pressure below piston 28' to open needle valve 37' and the main valve plunger closes with exactly the same characteristics as for the automatic closing.

It is sometimes desirable to eliminate from service the element 37' of the control mechanism when the main valve is operated by moving nut 84. This is desirable, as the pressure in the chamber 29' above the piston 28' always drops to atmosphere whenever the main valve is closed, regardless of how it is done. For normal hand operation, the pressure change on the two sides of piston 73 should not be interfered with; hence, a cock 99 is provided with its stem rigidly connected to a valve handle 111, in turn operated by lever 110 supported upon a collar rotatably carried in an annular groove on the left end of nut 84. When the main valve is operated by moving nut 84 the bearing 80 and the nut 84 always remain in contact; hence, as the valve is being closed the lever 110 comes into contact with valve handle 111 and closes cock 99, thus throwing out of service element 37'. When the valve is re-opened, lever 110 comes into contact with valve handle 111 and re-opens cock 99, so that subsequent automatic closing or remote closing can be accomplished without danger of element 37' being disconnected from service when it is needed.

Whenever automatic closing or remote closing is performed nut 84 remains in the position shown on the drawing, whereas bearing 80 moves to the right. Inasmuch as this method of closing is accomplished hydraulically, there should be no interference with the setting of cock 99 and hence arm 112 is provided to lift lever 110 so that it will not come into contact with valve handle 111 and hence will not close cock 99. After the main valve has been closed hydraulically it is necessary to turn back nut 84 until it again comes into contact with bearing 80, after which valve handle 111 can be closed by hand and the main valve can subsequently be re-opened in the usual way.

I claim:—

1. In a fluid control system the combination with a conduit having a valve provided with a casing, and a plunger telescoping therewith to form a fluid chamber, of fluid pressure operating means for opening and closing said valve, and control means for said operating means comprising connections to said conduit adapted to develop different pressures upon changes in the velocity of the flow in said conduit and means whereby the difference between said pressures actuates said control means to cause continuous closing movement of said valve after it has once started.

2. In a fluid control system the combination with a conduit having a valve, of fluid pressure operating means for opening and closing said valve, and means including a rotary motor device for controlling said fluid pressure operating means in accordance with pressure conditions in said conduit and causing said valve to move in its closing direction independently of the rotative speed of said motor.

3. In a fluid control system the combination with a conduit having a valve, of fluid pressure operating means for opening and closing said valve, and control means comprising a rotary motor device for actuating said fluid pressure operating means and means for automatically actuating said motor device upon occurrence of predetermined velocity conditions in said conduit.

4. In a fluid control system the combination with a conduit having a valve, of fluid pressure operating means for opening and closing said valve, and control means comprising a rotary motor device for said operating means and means for automatically actuating said motor device upon occurrence of predetermined conditions in said conduit, said automatic means comprising connections to points of different velocity effects in the conduit and means for differentially comparing the resulting pressures.

5. In a fluid control system the combination with a conduit having a valve, of fluid pressure operating means for opening and closing said valve, and control means comprising a rotary motor device for said operating means and means for automatically actuating said motor device upon occurrence of predetermined conditions in said conduit, said automatic means comprising connections on opposite sides of said valve and means for differentially comparing the resulting pressures.

6. In a fluid control system the combination with a conduit having a Venturi portion with different cross sectional areas, of a valve for said conduit provided with a casing and a plunger telescoping therewith to form a fluid chamber, operating means for said valve, control means for said operating means comprising connections to the different cross sectional areas, means for differentially comparing the relative pressures in said connections so as to actuate the control means to close the valve automatically upon the occurrence of a predetermined velocity in said Venturi portion of said conduit, and means to effect full closure of the valve, said closing movement, after once starting, being continuous irrespective of pressure conditions in the conduit thereafter.

7. In a fluid control system the combination with a conduit having a valve, of fluid pressure operating means for opening and closing said valve, control means comprising a rotary motor device adapted during any rate of rotation to actuate said fluid pressure operating means, said motor being necessarily rotatable throughout value movement and means for controlling said motor device from a distance.

8. In a fluid control system the combination with a conduit having a valve, of fluid pressure operating means for closing said valve, and control means comprising a rotary motor device for said operating means, means for controlling said motor device from a distance, and means for automatically actuating said motor device upon occurrence of a predetermined velocity in said conduit.

9. In a fluid control system the combination with a conduit having a valve, of fluid pressure operating means for opening and closing said valve, and control means comprising a rotary motor device for said operating means, means for controlling said motor device from a distance, and means for automatically actuating said motor device upon occurrence of a predetermined velocity in said conduit.

10. In a fluid control system the combination with a conduit having a valve, of operating means therefor comprising a chamber in which fluid pressure may act on said valve in a direction of its movement, fluid connections from said conduit to opposite sides of a piston so as to move said piston upon occurrence of predetermined conditions, a rotary motor device, and means whereby the movement of said piston controls said rotary motor device thereby to effect operation of said valve.

11. In a fluid control system the combination with a conduit having a valve, a fluid pressure operating means for opening and closing said valve, and control means comprising a motor device for said operating means and means for automatically moving said motor device upon occurrence of a predetermined condition in said conduit and automatically maintaining said motor movement throughout valve movement irrespective of subsequent changes in the conditions in said conduit.

12. In a fluid control system the combination with a conduit having a valve, of fluid pressure operating means for opening and closing said valve, and control means comprising a rotary motor device for said operating means, means for automatically completing the power circuit of said motor upon the occurrence of predetermined conditions in said conduit and maintaining said circuit irrespective of subsequent changes in the conditions in said conduit.

13. In a fluid control system the combination with a conduit having a valve, of means for operating said valve, and restoring mechanism connected to said operating means and comprising a member movable with said valve and an adjustable screw threaded connection between said operating means and said member, and means for adjusting the said connection to control the position of said valve automatically in accordance with velocity conditions in said conduit.

14. In a fluid control system the combination with a conduit having a valve, of operating means for opening and closing said valve, and control means for said operating means comprising connecting means to the up and downstream sides of said conduit adapted to automatically actuate said operating means to close said valve upon occurrence of a predetermined excess of pressure in said conduit.

15. In a fluid control system the combination with a conduit having a valve, of power operating means for opening and closing said valve, and control means for said operating means comprising connecting means to said conduit adapted to actuate said operating means to close said valve automatically upon occurrence of a predetermined excess of pressure in said conduit and maintaining the closing movement of said valve irrespective of subsequent changes in the pressure in said conduit.

16. In a fluid control system the combination with a conduit having a valve, of fluid pressure operating means for opening and closing said valve, control means for said operating means including connections to said conduit adapted to develop different pressures upon changes in the velocity in the flow in said conduit restoring mechanism associated with said valve and hydraulically operated means whereby the difference between said pressures effects actuation of said control means to cause a closure of said valve.

17. In a fluid control system the combination with a conduit having a valve, of fluid pressure operating means for opening and closing said valve including a rotary motor, and control means for said operating means comprising restoring mechanism associated with said valve and connections to said conduit adapted to develop different pressures upon changes in the velocity in the flow in said conduit and means whereby the difference between said pressures actuates said control means to cause a closure of said valve.

18. In combination with a conduit, a valve comprising a casing, a hollow member within the casing having a plunger, means for shifting said plunger to open and close the valve, and means extending to the exterior of the valve and connecting the interior of said hollow member to a point in the conduit below the valve plunger and comprising a check valve permitting fluid to pass in only one direction with relation to the interior of the hollow member.

19. In combination with a conduit, a valve comprising a casing, a hollow member within the casing having a plunger, means for shifting said plunger to open and close the valve, and means extending to the exterior of the valve and connecting the interior of said hollow member to a point in the conduit below the valve plunger and comprising a check valve permitting fluid to pass from the interior of the hollow member to the conduit but checking any back flow from the conduit to the interior of said hollow member.

20. In combination with a conduit, a valve comprising a casing, a hollow member within the casing having a plunger, means for shifting said plunger to open and close the valve, and means connecting the interior of said hollow member to a point in the conduit below the valve plunger and comprising a check valve permitting fluid to pass from the interior of the hollow member to the conduit but checking any back flow from the conduit to the interior of said hollow member.

21. In a fluid control system the combination with a conduit having a valve, of operating means for opening and closing said valve, and control means for said operating means comprising means having fluid communication with said conduit adapted to develop differential pressures caused by an increase in the velocity of the flow in said conduit thereby to cause complete closure of said valve and means whereby an excessive pressure actuates said control means to cause a closure of said valve.

22. In a fluid control system the combination with a conduit having a valve, of operating means for opening and closing said valve, and control means for said operating means comprising means having fluid communication with said conduit adapted to develop differential pressures caused by an increase in the velocity of the flow in said conduit and means whereby either the difference between said pressures or an excessive pressure actuates said control means to cause a closure of said valve.

23. In a fluid control system the combination with a conduit having a valve adapted to open or close to pass or stop the flow, of fluid pressure operating means for opening and closing said valve, and control means for said operating means comprising connections to the up and downstream sides of said conduit and means whereby an excessive pressure in said conduit actuates said control means to cause a closure of said valve.

24. In a fluid control system the combination with a conduit having a valve adapted to open or close to pass or stop the flow, of fluid pressure operating means for opening and closing said valve, and control means for said operating means comprising a connection to said conduit and means whereby an excessive pressure in said conduit actuates said control means to begin the closing of said valve and maintain said closing movement irrespective of subsequent pressure changes.

25. In a fluid control system the combination with a conduit having a valve adapted to open or close to pass or stop the flow, of fluid pressure operating means for opening and closing said valve, and control means for said operating means comprising restoring mechanism associated with said valve and a connection to said conduit and means whereby a predetermined change in the flow in said conduit actuates said control means to begin a closing movement of said valve and maintain said closing movement irrespective of subsequent changes in the conditions in said conduit.

26. In a fluid control system, the combination with a conduit having a valve, of power operating means for opening and closing said valve, control means for said power means comprising restoring mechanism and means responsive to changes of velocity of the flow in said conduit, and means whereby, when a predetermined velocity flow occurs, said power means will be actuated to cause complete closure of said valve after closing movement thereof has been once started, and irrespective of fluid conditions existing in said conduit after the valve has started to close.

27. In a fluid control system, the combination with a conduit having a valve, of power operating means for opening and closing said valve, control means for said operating means, including an electrical switch and means for closing the same in accordance with changes of velocity of the flow in said conduit and maintaining the said switch closed irrespective of further conditions in said conduit, whereby said power operated means, upon once starting to effect closing movement of said valve, will continue until the valve is completely closed.

28. In a fluid control system, the combination with a conduit having a valve, of power operating means for opening and closing said valve and control means for said operating means, including a compensating mechanism having a rod attached to and movable with the valve, a screw having operative threaded connection to said rod, power means for rotating said screw, and means whereby power is supplied thereto automatically in accordance with the velocity changes in said conduit.

29. In a fluid control system, the combination with a conduit having a valve, of power operating means for opening and closing said valve and control means for said operating means, including a compensating mechanism having a rod attached to and movable with the valve, a screw having operative threaded connection to said rod, power means for rotating said screw, and means whereby power is supplied thereto automatically in accordance with the velocity changes in said conduit, and a valve mechanism for controlling power to the power operating means operatively connected to said screw.

30. In combination, a valve mechanism comprising inner and outer casings, spaced to form a smooth fluid passageway therebetween, while the outer casing has a contracted portion provided with a valve seat, and a plunger valve having telescopic relation with said inner casing, thereby to form an internal plunger chamber, a pipe allowing communication between said chamber and a point in said valve mechanism below said seat, and a check valve in said pipe adapted to allow fluid flow therethrough in only one direction.

31. In combination, a valve mechanism adapted to be interposed between up and down stream pipes of a pipe line and having a movable valve element and means cooperating therewith to form therebetween a fluid chamber, a seat with which said element is adapted to cooperate, a pipe allowing communication between said chamber and pipe line at a point below said seat, and means whereby fluid may flow through said communicating pipe in only one direction.

32. In combination, a valve mechanism adapted to be disposed in a conduit, means forming a chamber in which fluid pressure acts on said valve in the direction of certain of its movements, means for controlling closing movement of the valve automatically upon occurrence of a predetermined velocity flow through said conduit, including means whereby, when closing movement is once started, it will continue until the valve is closed, irrespective of the velocity conditions which might prevail thereafter, and means for permitting fluid communication between said chamber and said conduit at a point thereof below the valve seat.

33. In combination, a valve mechanism adapted to be disposed in a conduit, means for controlling closing movement of the valve automatically upon occurrence of a predetermined velocity flow through said conduit, including means whereby, when closing movement is once started, it will continue until the valve is closed, irrespective of the velocity conditions which might prevail thereafter, means for permitting fluid communication between one side of said valve and said conduit at a point thereof below the valve seat, said latter means comprising a fluid connection communicating internally with the valve mechanism and being adapted to automatically retard valve movement when the valve has reached a predetermined point in its travel.

34. In a fluid control system, the combination with a conduit having a valve, of operating means for closing said valve including a chamber in which fluid pressure acts in a closing direction on said valve, and means including a rotary motor device for controlling said operating means, in accordance with pressure conditions in said conduit, and causing said valve to move in a closing direction independently of the rotative speed of said motor.

35. In a fluid control system, the combination with a conduit having a valve, of operating means for opening said valve including a chamber in which fluid pressure acts in an opening direction on said valve, and means including a rotary motor device for controlling said operating means in accordance with pressure conditions in said conduit, and causing said valve to move in an opening direction independently of the rotative speed of said motor.

36. In a fluid control system, the combination with a conduit having a valve, of fluid pressure operating means for opening and closing said valve, and means including a rotary motor for controlling said fluid pressure operating means, said motor being necessarily rotatable throughout the valve closing movement, which is effected during any rate of rotation of said motor, and means including a blow-off valve for initiating operation of said motor.

37. In a fluid control system, the combination with a conduit having a valve, of means for controlling movements of said valve including a restoring mechanism associated therewith, fluid pressure controlling means adapted to be controlled by said restoring mechanism, a power operated motor for effecting coordination of said restoring mechanism and fluid pressure control means, and means for controlling said motor in accordance with pressure conditions in said conduit.

38. In a fluid control system, the combination with a conduit having a valve, of a valve plunger, means cooperating therewith to form an internal chamber in which pressure may act upon said plunger in a closing direction, a control valve mechanism for controlling fluid flow relative to said chamber, a restoring mechanism associated with said plunger, means for coordinating the operation of said restoring mechanism and control valve including a power motor adapted to be subjected continuously to power throughout the closing movement, and a passage permitting fluid communication between said chamber and conduit.

39. In a fluid control system, the combination with a conduit having a valve, of a valve plunger, means cooperating therewith to form an internal chamber in which pressure may act upon said plunger in a closing direction, means forming an opening fluid chamber, a control valve mechanism for controlling fluid flow relative to said chambers, a restoring mechanism associated with said plunger, means for coordinating the operation of said restoring mechanism and control valve including a power motor adapted to be subjected continuously to power throughout the closing movement, and an external pipe adapted to have fluid flow therethrough in only one direction between said internal chamber and conduit.

40. In a fluid control system, the combination with a conduit having a valve, of fluid pressure means for opening or closing said valve including a piston element, means cooperating therewith to form opening and closing fluid pressure chambers, a valve for controlling fluid flow relative to said chambers, and means for controlling movement of said latter valve including a restoring mechanism associated with the conduit valve, said restoring mechanism comprising a longitudinally movable rod carrying a nut, a rotatable screw cooperating with said nut, a motor for rotating said screw, and hydraulic means for controlling said motor and made operative automatically in accordance with pressure conditions in said conduit.

41. In a fluid control system, the combination with a conduit having a valve, of operating means for opening and closing said valve, and control means for said operating means comprising connecting means to said conduit adapted to actuate said operating means to close said valve automatically upon occurrence of a predetermined excess of pressure in said conduit and to maintain closing movement irrespective of subsequent pressure conditions in said conduit.

OTTO V. KRUSE.